(12) United States Patent
Lapeyre et al.

(10) Patent No.: US 11,674,852 B1
(45) Date of Patent: Jun. 13, 2023

(54) STIRRING PADDLE WITH INTEGRATED SENSOR

(71) Applicants: Robert T. Lapeyre, New Orleans, LA (US); Robert S. Lapeyre, New Orleans, LA (US)

(72) Inventors: Robert T. Lapeyre, New Orleans, LA (US); Robert S. Lapeyre, New Orleans, LA (US)

( * ) Notice: Subject to any disclaimer, the term of this patent is extended or adjusted under 35 U.S.C. 154(b) by 310 days.

(21) Appl. No.: 17/070,884

(22) Filed: Oct. 14, 2020

Related U.S. Application Data

(60) Provisional application No. 62/897,031, filed on Sep. 6, 2019.

(51) Int. Cl.
*G01K 1/02* (2021.01)
*A47J 43/28* (2006.01)
*G01K 13/00* (2021.01)

(52) U.S. Cl.
CPC ............. *G01K 1/02* (2013.01); *A47J 43/288* (2013.01); *G01K 13/00* (2013.01); *A47J 2202/00* (2013.01)

(58) Field of Classification Search
CPC ........ G01K 11/32; G01K 11/324; G01K 1/14; G01K 11/3206; G01K 11/322; G01K 3/14; G01K 1/026; G01K 13/00; G01K 2007/166; G01K 3/06; G01K 3/10; G01K 1/02; A47J 43/288; A47J 2202/00
See application file for complete search history.

(56) References Cited

U.S. PATENT DOCUMENTS

| 3,695,110 | A | * | 10/1972 | Biolik | A61J 7/0023 374/E1.018 |
| 5,575,563 | A | * | 11/1996 | Chiu | G01K 1/14 374/150 |
| 5,634,719 | A | * | 6/1997 | La Neve | G01K 1/146 374/208 |
| 7,793,559 | B2 | * | 9/2010 | Susfalk | G01D 9/005 73/866.5 |
| 7,883,267 | B2 | * | 2/2011 | Perry | G01K 1/028 374/100 |
| 11,067,457 | B2 | * | 7/2021 | Birnkrant | G01K 11/32 |
| 2002/0124737 | A1 | * | 9/2002 | Bedetti | F24C 7/08 99/342 |
| 2009/0112507 | A1 | * | 4/2009 | Edney | G01N 33/2888 702/136 |
| 2011/0044370 | A1 | * | 2/2011 | Schochet | G01K 13/00 374/E1.002 |
| 2013/0128919 | A1 | * | 5/2013 | Austen | G01K 1/026 374/E3.001 |

(Continued)

FOREIGN PATENT DOCUMENTS

| CN | 1987380 A | * | 6/2007 | ......... A47J 43/1093 |
| CN | 201346088 Y | * | 11/2009 | |
| CN | 201370390 Y | * | 12/2009 | |

(Continued)

*Primary Examiner* — Gail Kaplan Verbitsky
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

A stirring paddle for a cooking pot having a temperature sensor that preferably extends from the paddle handle to a paddle shaft and to the paddle blade. A display in the handle or grip or in the shaft displays temperature measured by the temperature sensor.

19 Claims, 19 Drawing Sheets

(56) References Cited

U.S. PATENT DOCUMENTS

2018/0000267 A1* 1/2018 Kim ................. A47G 21/04
2022/0400195 A1* 12/2022 Churovich ............ H04N 23/56

FOREIGN PATENT DOCUMENTS

| | | | | | |
|---|---|---|---|---|---|
| CN | 204007734 | U | * | 12/2014 | ............ G01F 1/363 |
| CN | 205568564 | U | * | 9/2016 | |
| CN | 108209639 | A | * | 6/2018 | |
| CN | 109406007 | A | * | 3/2019 | ............ E21B 33/13 |
| CN | 208957561 | U | * | 6/2019 | |
| CN | 111696302 | A | * | 9/2020 | ............ G01K 13/00 |
| CN | 111696303 | A | * | 9/2020 | |
| CN | 211452635 | U | * | 9/2020 | |
| CN | 213551038 | U | * | 6/2021 | |
| CN | 214484139 | U | * | 10/2021 | |
| CN | 216124220 | U | * | 3/2022 | |
| JP | 2001314302 | A | * | 11/2001 | |
| JP | 2015132530 | A | * | 7/2015 | |
| KR | 200222742 | Y1 | * | 10/2000 | |

* cited by examiner

STIRRING PADDLE WITH INTEGRATED SENSOR

CROSS-REFERENCE TO RELATED APPLICATIONS

This patent application claims priority of and incorporates herein by reference U.S. Provisional Patent Application Ser. No. 62/897,031, filed on or about 6 Sep. 2019.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates generally to handheld utensils that are used to prepare food and in particular to an improved, stirring paddle for use in boiling (e.g., seafood) in large cooking pots (e.g., 100 quart) and having instrumentation such as temperature, pH and salinity.

2. General Background of the Invention

When boiling seafood or home brewing beer, it is critical that temperature is monitored and controlled. Often when boiling or brewing, constant stirring and agitation is required in order to achieve rapid and even cooling of the medium being boiled or cooked. Stirring paddles are commonly used in the art to mix and stir the contents being boiled. A thermometer is also required. Using a thermometer while trying to maintain constant stirring poses challenges for a single operator and requires the operator to stop stirring for periods of time in order to check temperature. This is particularly a problem when the operator is trying to lower the temperature of the medium. Stopping the stirring process to check temperature or other parameters, like salinity or pH, can result in inaccurate readings and missed target temperatures. Having to have a secondary tool to measure temperature often results in neglect to using a thermometer entirely.

U.S. Provisional Patent Application Ser. No. 62/897,031, filed on or about 6 Sep. 2019, is hereby incorporated herein by reference.

BRIEF SUMMARY OF THE INVENTION

The present invention solves the problems in the prior art in a simple and straightforward manner.

The present invention provides an improved stirring paddle apparatus having a handle or grip, a blade, and an elongated shaft that extends between the grip and the blade. A sensor in the paddle is able to make temperature, salinity, and/or pH readings. A display in the paddle preferably enables display of the sensor readings.

Another embodiment of the present invention of a stirring paddle preferably includes a grip, a blade, a shaft between the grip and the blade and a temperature sensor in the blade that preferably has a sensing element that makes the temperature readings. A display is provided in an upper portion of the paddle and displays the temperature readings.

Another embodiment of the present invention of a stirring paddle provides a grip, a blade, a shaft between the grip and the blade, and a notch, recess or concave portion on the shaft that facilitates lifting a cooking pot's strainer or basket.

The present invention includes a paddle thermometer apparatus preferably including an elongated shaft preferably having a longitudinal axis and opposed first and second end portions. The shaft preferably having a maximum transverse thickness. A handle can be attached to the first end portion. An enlarged paddle section is preferably attached to the second end portion, wherein the paddle section preferably has a maximum thickness greater than the shaft transverse thickness. Preferably including a plurality of spaced apart openings or slots wherein each opening or slot is intersected by the longitudinal axis. An elongated thermometer cable can extend between the handle and the paddle section. The thermometer cable preferably includes a sensor positioned in an opening or slot in the paddle section. The thermometer preferably including a display that enables display of a temperature value sensed by the sensor.

In one or more embodiments, one or more of the openings or slots can be closer to the handle than to the paddle section.

In one or more embodiments, one or more of the openings or slots are preferably closer to the paddle section than to the handle.

In one or more embodiments, the handle preferably has opposed handle sides and wherein the display is preferably mounted to one of the handle sides.

In one or more embodiments, the handle preferably has a handle top and the display is preferably mounted on the handle top.

In one or more embodiments, further comprising a recess on the shaft that is preferably sized and shaped to support a pot or basket rail.

In one or more embodiments, the openings preferably include a first plurality of openings or slots on one side of the shaft and a second plurality of openings or slots on another side of the shaft, wherein each opening or slot of the first plurality are preferably spaced away from each opening or slot of the second plurality.

In one or more embodiments, the recess is preferably U-shaped.

In one or more embodiments, the recess is preferably spaced in between two openings or slots.

In one or more embodiments, the cable preferably extends a majority of the distance between the handle and the paddle section.

The present invention includes a paddle thermometer apparatus preferably including an elongated shaft preferably having a longitudinal axis and opposed first and second end portions; the shaft preferably having a maximum transverse thickness; a handle preferably attached to the first end portion; an enlarged paddle section preferably attached to the second end portion, wherein the paddle section has a maximum thickness greater than the shaft transverse thickness; a plurality of at least three (3) openings or slots in the shaft preferably spaced between the handle and the paddle section; an elongated thermometer cable that preferably extends between the handle and the paddle section; thermometer cable preferably including a sensor positioned in an opening or slot in the paddle section; and the thermometer preferably including a display that enables display of a temperature value sensed by the sensor.

In one or more embodiments, each slot or opening preferably has a length and a width that is smaller than the length.

In one or more embodiments, the paddle section is preferably comprised of a pair of metallic panels that sandwich a portion of the thermometer cable there between.

In one or more embodiments, the thermometer cable preferably extends from the paddle section to the handle.

In one or more embodiments, the combination of the shaft, handle and paddle section is preferably at least about 24 inches long.

In one or more embodiments, the cable has upper and lower ends, the upper end preferably connecting to the display and the lower end portion having the sensor.

In one or more embodiments, the slots are preferably offset from the longitudinal axis.

In one or more embodiments, the openings or slots are preferably spaced apart by at least about 0.25 and 3.5 inches.

In one or more embodiments, some of the openings or slots are preferably offset from others of the openings or slots and wherein multiple of the slots are preferably offset from the longitudinal axis.

The present invention includes a paddle thermometer apparatus preferably including an elongated shaft preferably having a longitudinal axis and opposed first and second end portions; the shaft preferably having a maximum transverse thickness; a handle preferably attached to the first end portion; an enlarged paddle section preferably attached to the second end portion, wherein the paddle section preferably has a maximum thickness greater than the shaft transverse thickness; a plurality of spaced apart openings or slots wherein each opening or slot is preferably intersected by the longitudinal axis; an elongated thermometer cable that preferably extends to the paddle section and along a majority of the shaft the thermometer cable preferably including a sensor positioned in an opening or slot in the paddle section; and the thermometer including a display that preferably enables display of a temperature value sensed by the sensor.

The present invention includes a paddle thermometer apparatus preferably comprising:

a) an elongated tubular shaft preferably having a longitudinal axis, a hollow bore and opposed first and second end portions;

b) the shaft preferably having a maximum transverse thickness;

c) a handle preferably attached to the first end portion;

d) an enlarged paddle section preferably attached to the second end portion, wherein the paddle section preferably has a maximum thickness greater than the shaft transverse thickness;

e) an elongated thermometer cable that preferably extends through the hollow bore between the handle and the paddle section;

f) the thermometer cable preferably including a sensor positioned in a paddle section; and g) the thermometer preferably including a display next to the handle that preferably enables display of a temperature value sensed by the sensor.

In one or more embodiments, the elongated tubular shaft can be generally cylindrically shaped.

In one or more embodiments, the blade section preferably includes first and second blade panels connected together with the sensor between the blade panels.

In one or more embodiments, further comprising one or more rings or collars on the shaft, each ring or collar preferably having a concave outer surface portion.

In one or more embodiments, further comprising a fitting connected to the shaft, wherein the blade section preferably connects to the fitting.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
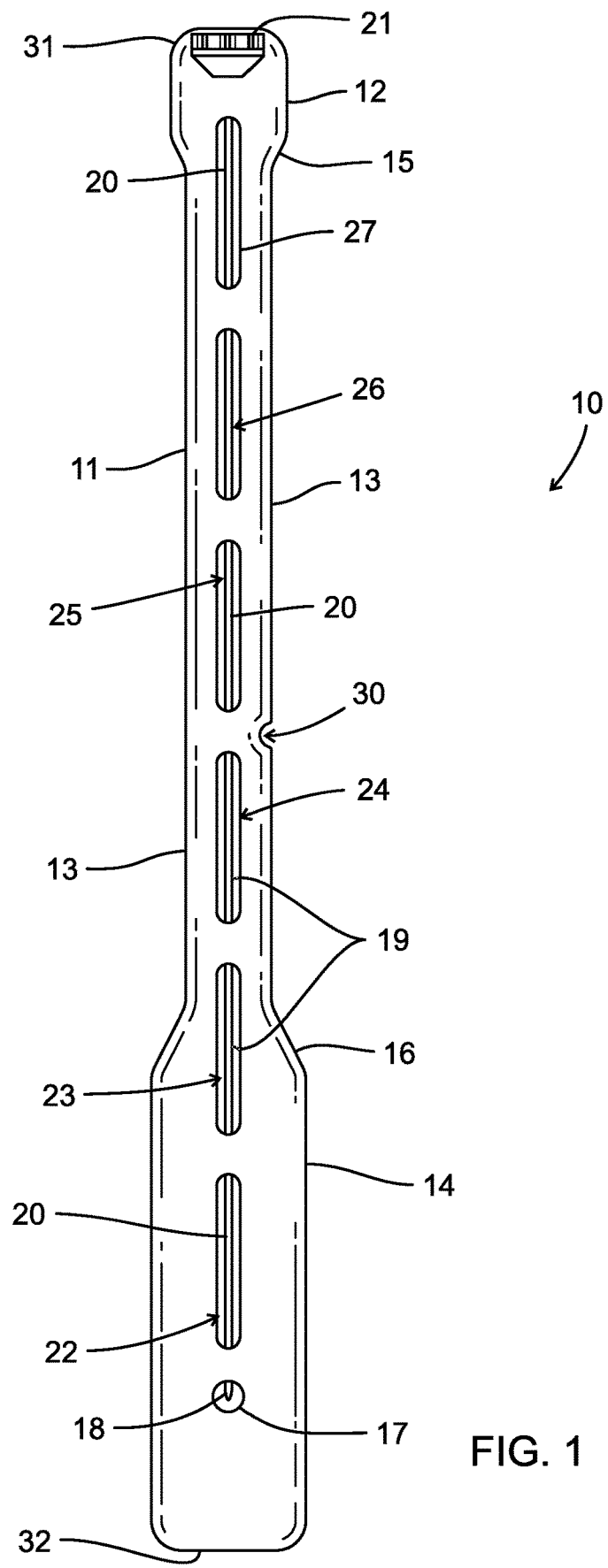
FIG. 1 illustrates a front elevation view of a preferred embodiment of the apparatus of the present invention.
Figure 2:
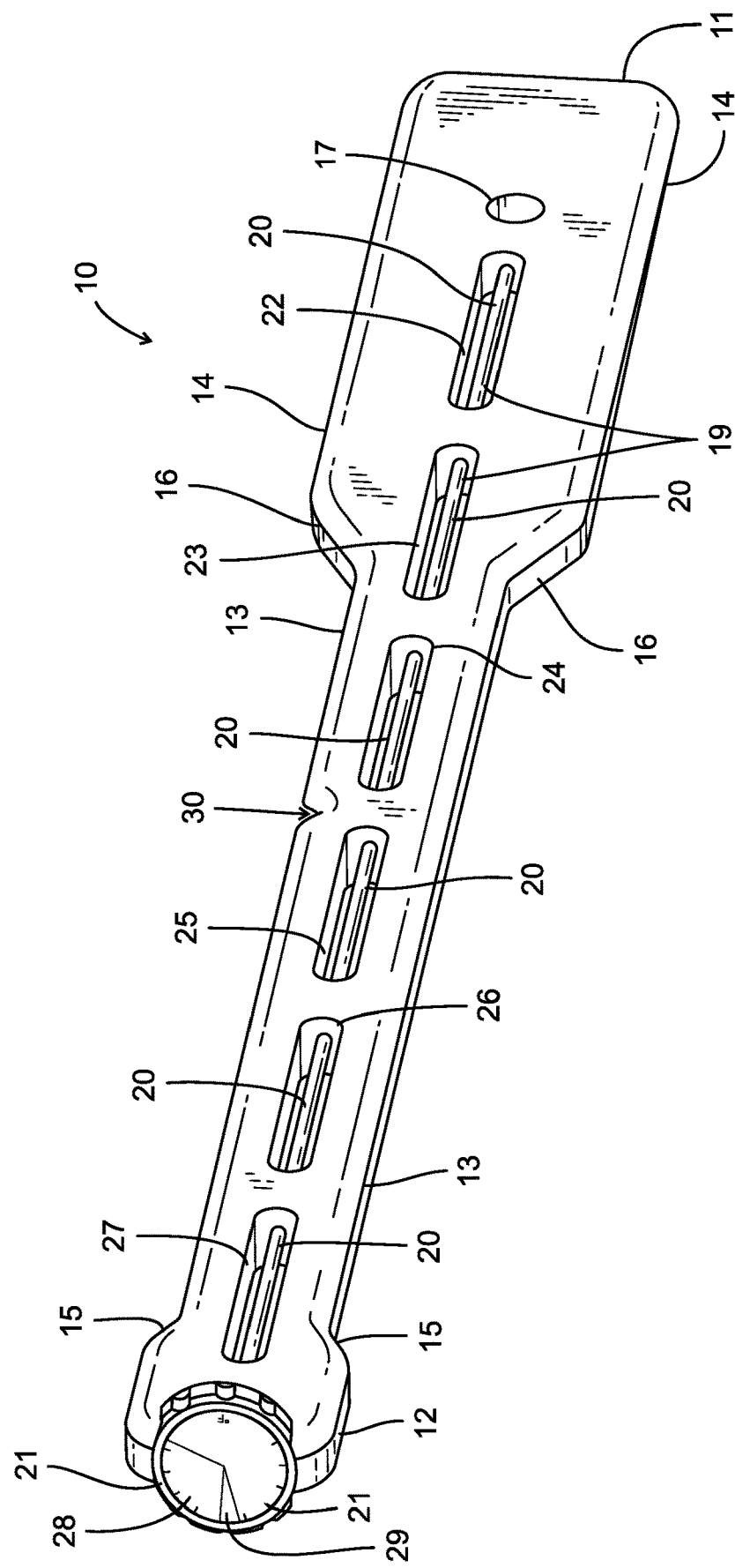
FIG. 2 is a perspective view of a preferred embodiment of the apparatus of the present invention.

FIGS. 1-4 show a preferred embodiment of the apparatus of the present invention, designated generally by the numeral 10. Stirring paddle apparatus 10 provides an elongated paddle 11 preferably having a length of between about 24 and 48 inches. Paddle apparatus 10 provides paddle 11 preferably made of wood, metal or plastic. Paddle 11 has upper end 31 and lower end 32. The paddle 11 preferably includes a handle or grip or handle section 12, an elongated shaft 13 and a blade or blade section 14. Handle section 12 preferably joins shaft 13 at tapered or transition section 15. Blade section 14 preferably joins shaft 13 at tapered or transition section 16.

Figure 8:
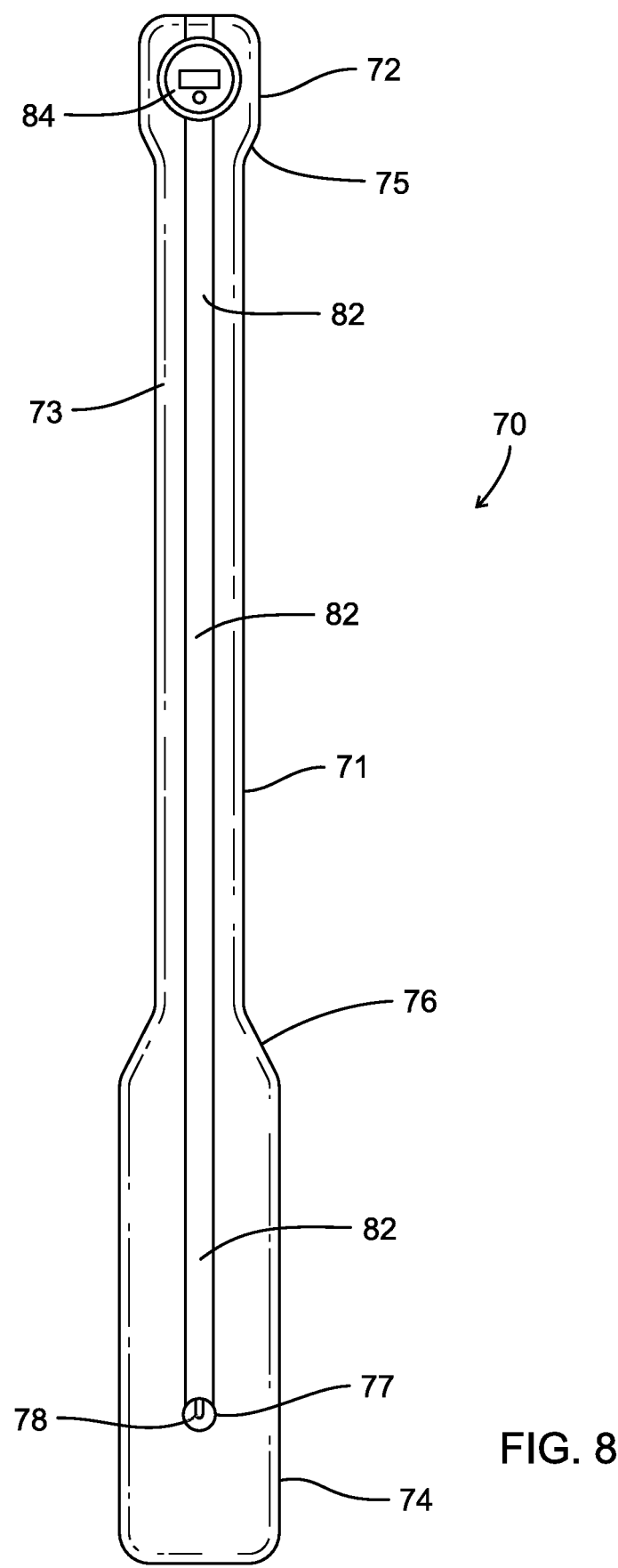
FIG. 8 is a front elevation view of another preferred embodiment of the apparatus of the present invention.
Figure 9:
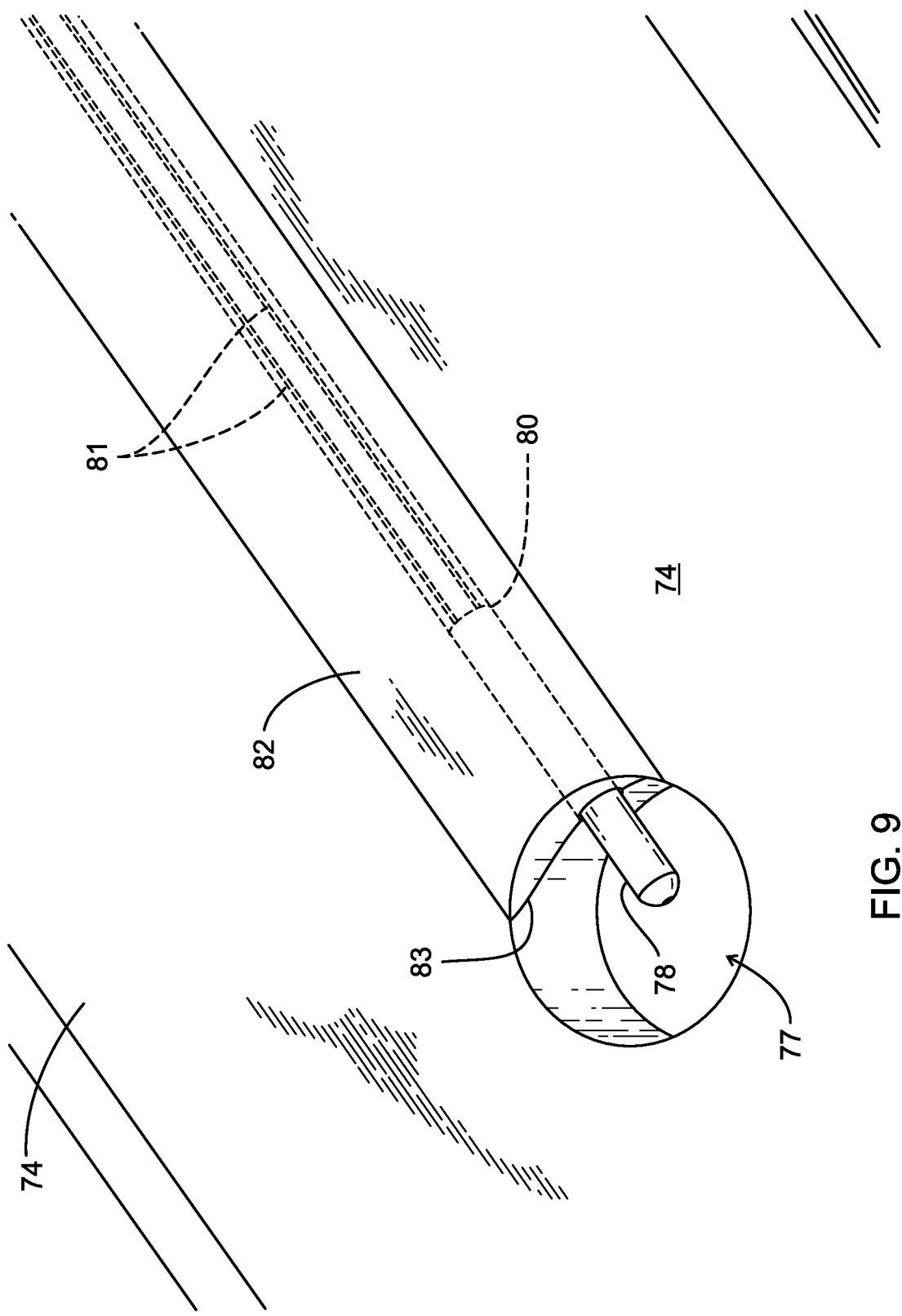
FIG. 9 is a fragmentary perspective view of a preferred embodiment of FIG. 8.
Figure 10:
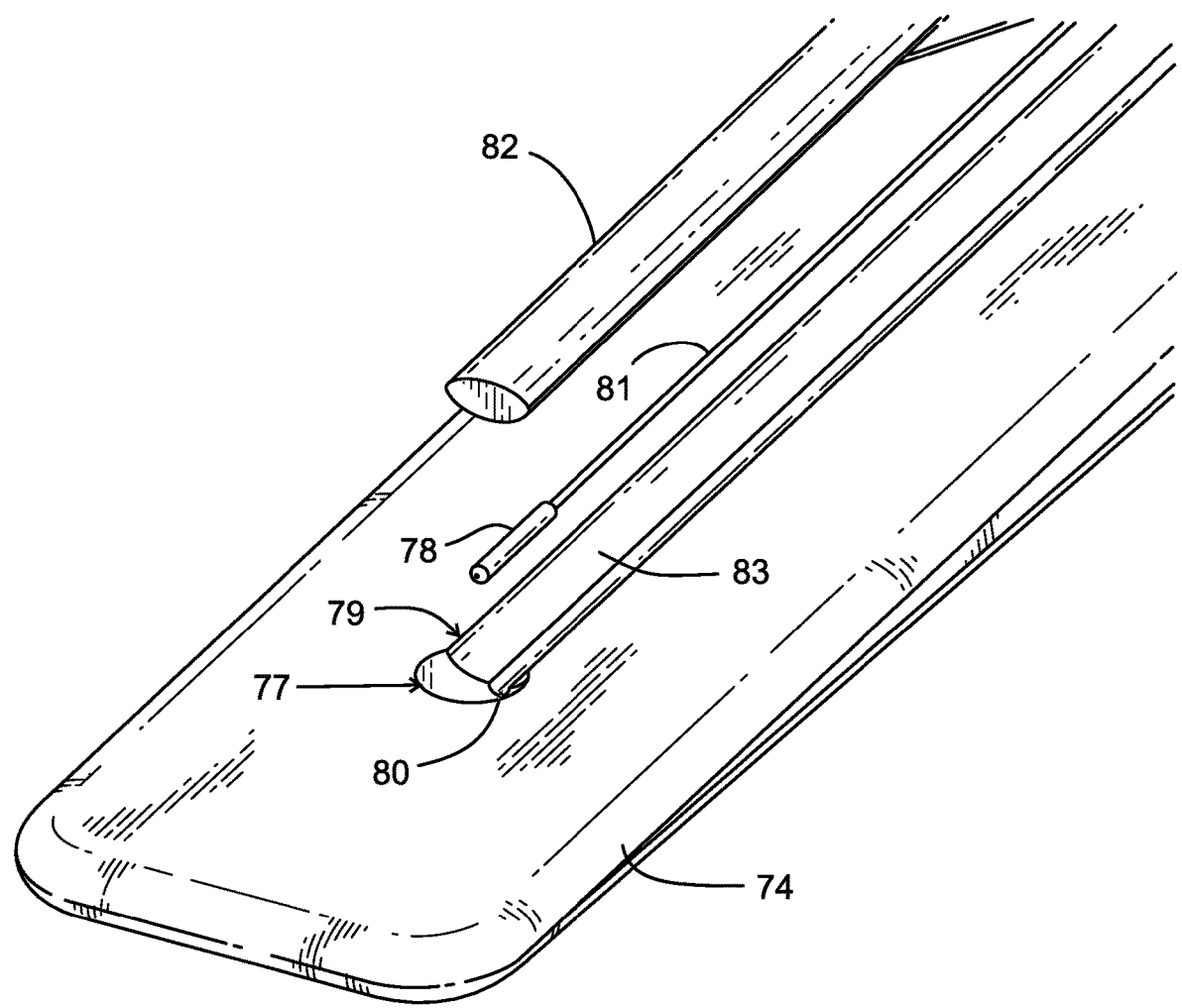
FIG. 10 is a fragmentary perspective view of a preferred embodiment of FIG. 8.
Figure 11:
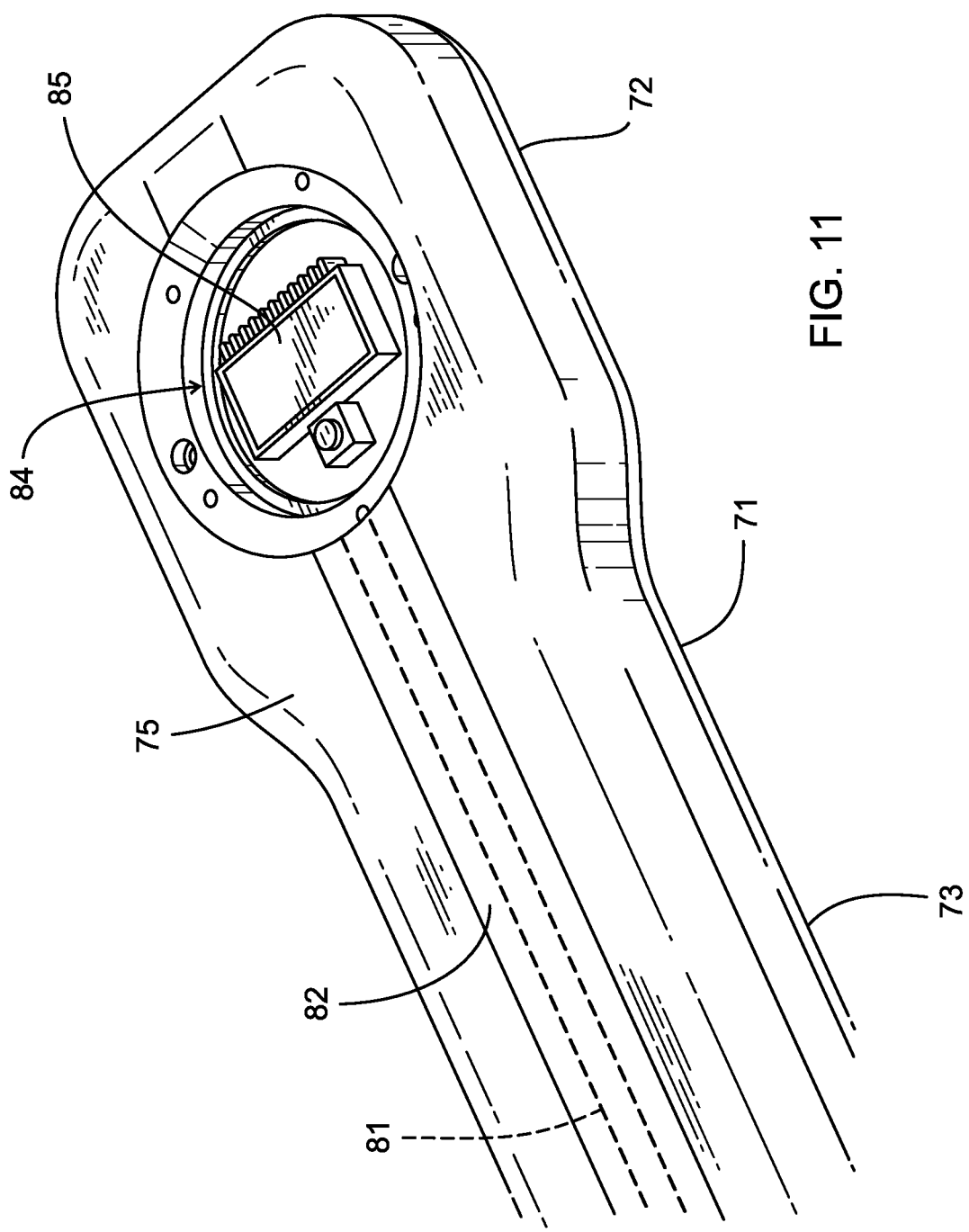
FIG. 11 is a fragmentary perspective view of a preferred embodiment of FIG. 8.

A sensing device 19 is preferably contained within paddle 11, extending from an upper portion of paddle 11 near handle section 12 to shaft 13 and to blade section 14 as seen in FIGS. 1-4. Sensing device 19 can be a thermometer, pH meter, salinity meter or other meter. Such sensing devices are commercially available (www.reotemp.com). Sensing device 19 preferably has a display or readout 21 preferably having dial 28 and pointer or indicator 29 at a handle section 12. Display 21 can be mounted at upper end 32 of paddle 11 (see for example FIG. 1, 2) or mounted to shaft 13 near handle section 12 (see for example FIGS. 8 and 11). Display 21 can be made of rubber or another suitable shock absorbing material. Sensing device 19 preferably has a sensing device cable or thermometer 20 that extends from display 21 to probe or sensing tip 18. Sensing device cable or thermometer 20 can be a commercially available bi-metal thermometer (www.reotemp.com). Tip 18 preferably extends into opening 17 in paddle section 14. Opening 17 is open ended so that fluid can contact probe or sensing tip 18 from each side of blade section 11.

Figure 3:
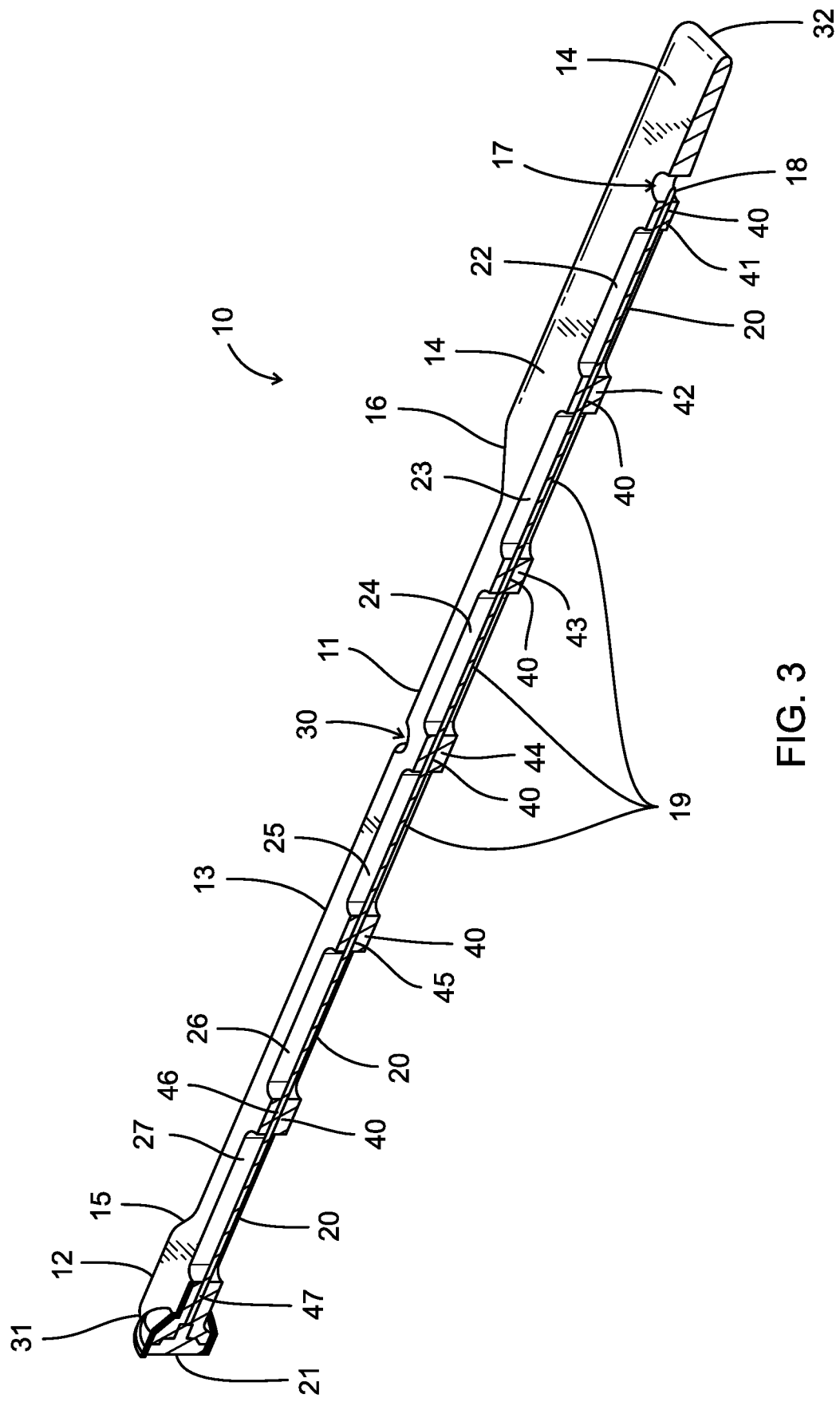
FIG. 3 is a sectional perspective view of a preferred embodiment of the apparatus of the present invention.

A plurality of slots or openings 22-27 can be formed in paddle 11. Slots or openings 22-27 are preferably spaced apart and extend from blade section 14 to handle section 12 as seen in FIGS. 1-4. Slots or openings 22-27 can be used to hold a drill guide that helps align a drill bit when forming an elongated longitudinally extending bore 40 in paddle 11 that can preferably contain sensor device cable or thermometer 20 of sensing device 19. Bore 40 preferably has multiple bore sections 41-47 as seen in FIG. 3. Each bore 40 section 41-46 is preferably in between two of the slots or openings 17, 22-27. Bore section 47 preferably extends between display 21 and slot or opening 27. Each bore section 41-47 can be about 1 inch long.

Figure 4:
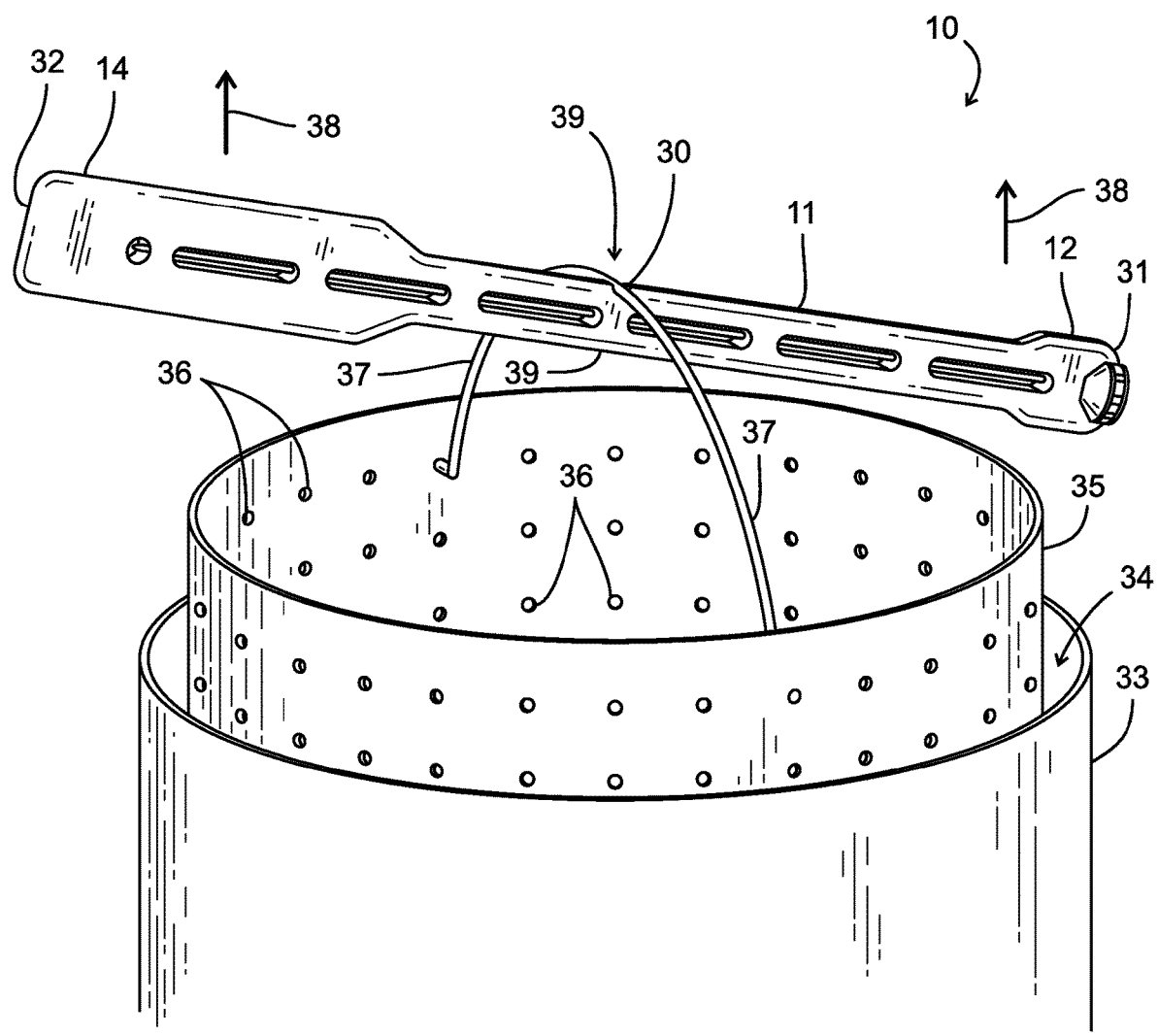
FIG. 4 is a perspective view of a preferred embodiment of the apparatus of the present invention showing the paddle lifting a food containing basket or liner from a pot.

FIG. 4 illustrates that paddle apparatus 10 can be used to lift a basket, strainer or liner 35 (that typically contains food items) having openings 36 from pot 33 interior 34. Such pot 33 and basket 35 cooking devices are known and commercially available, such as those manufactured by Bayou Classic™ and sold by Academy Sports+Outdoors (www.academy.com) such as model number KDS-182. Academy Sports also sells OUTDOOR GOURMET™ 100 quart pot with strainer (Academy Item number 155365). Such baskets, strainers or liners 35 typically have a bail or handle 37.

In FIG. 4, paddle apparatus 10 can be used to add basket or strainer 35 to pot 33 interior 34 such as when placing items to be cooked into pot 33. Paddle apparatus 10 can also be used to remove basket or strainer 35 from pot 33 interior 34 when cooking is completed. In FIG. 4, two persons or users can manipulate paddle apparatus 10, one person holding paddle 11 at handle 12 while the other person preferably holds blade section 14. Arrows 38 in FIG. 4 illustrate a lifting of basket 35 from pot 33 after cooking is completed. Notch or recess or concavity 30 is preferably placed near mid-point 39 of paddle 11 for good balancing. For example, for a 36 inch long paddle 11, notch or recess or concavity 30 is preferably spaced about 18 inches from lower end 32. During lifting as shown in FIG. 4, bail or handle 37 of liner, basket or strainer 35 is placed in notch, recess or concavity 30. Notch, recess or concavity 30 can be positioned in between openings or slots 24 and 25. Preferably notch, recess or concavity 30 is positioned over a solid area that is not above a slot 22-27. Preferably when paddle 11 is held in a tilted position as seen in FIG. 4, bail or handle 37 remains vertically positioned, to prevent the food contents in liner, basket or strainer 35 from spilling out. Preferably, paddle 11 can be tilted at an angle where blade 14 or handle 12 touches pot 33, and bail or handle 37 remains vertically positioned.

Figure 5:
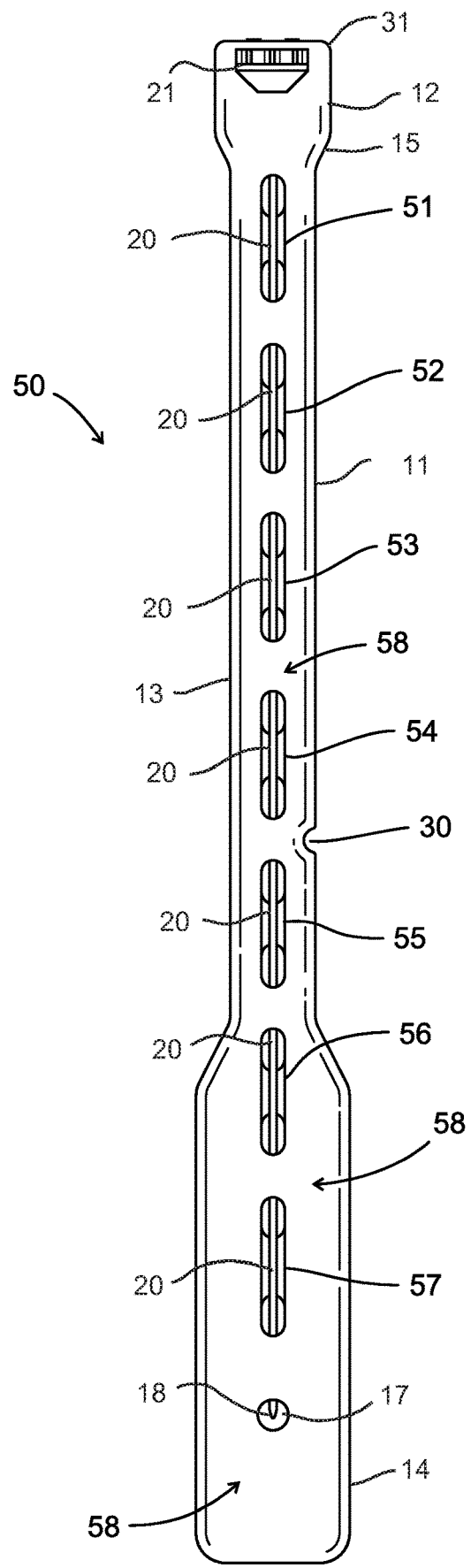
FIG. 5 is an elevation view of another preferred embodiment of the apparatus of the present invention.
Figure 6:
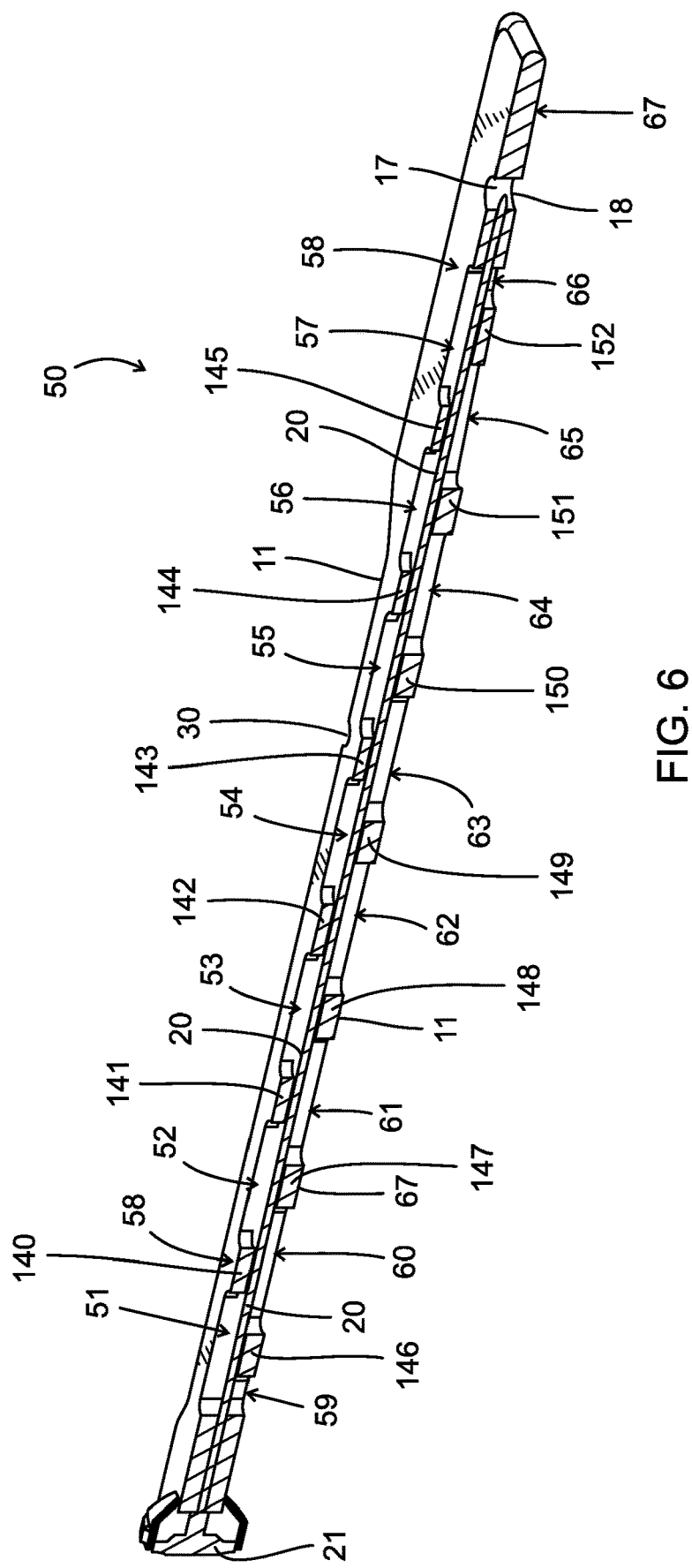
FIG. 6 is a sectional perspective view of a preferred embodiment of FIG. 5.
Figure 7:
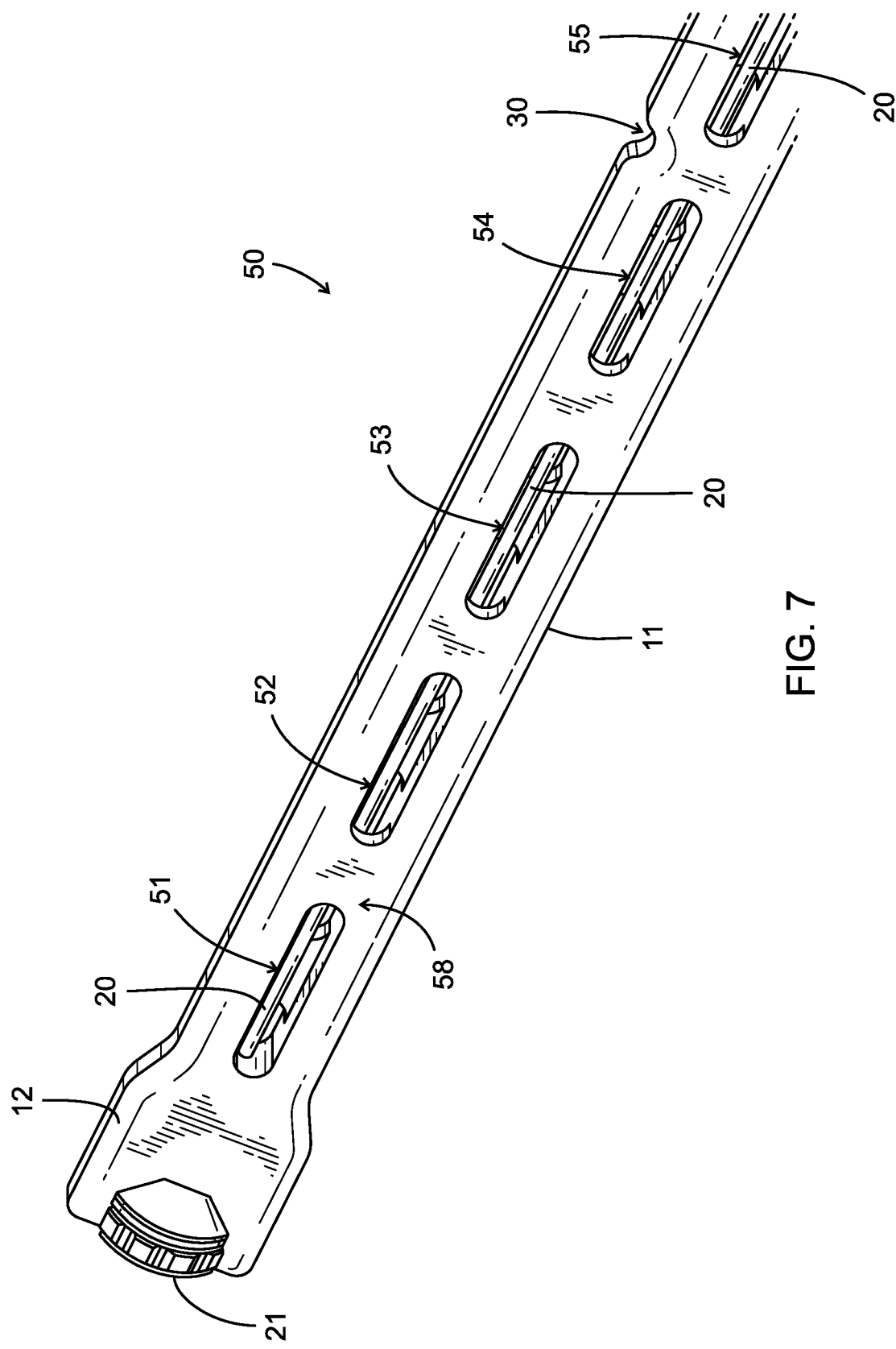
FIG. 7 is a fragmentary perspective view of a preferred embodiment of FIG. 5.

A second preferred embodiment of the apparatus of the present invention is seen in FIGS. 5-7 designated generally by the numeral 50. A preferred embodiment of FIGS. 5-7 is similar to the embodiment of FIGS. 1-4 with differing or alternating slots or openings. Instead of the slots or openings 22-27, there are preferably staggered slots or openings. A first plurality of slots or openings 51-57 are preferably in communication with one side surface 58 of paddle 11. A first plurality of members or sections 140-145 are preferably in between two of the slots or openings 51-57. A second plurality of slots or openings 59-66 are preferably in communication with a second side 67 of paddle 11. A second plurality of members or sections 146-152 are preferably in between two of the slots or openings 59-66. In FIGS. 5-7, notch or recess or concavity 30 can be positioned in between slots or openings 54 and 55 (see FIG. 7). Each section 140-145, 146-152 can be about 1 inch long. Sensing device 19 and sensing cable or thermometer 20 can be held in between alternating members 140-145 and members 146-152 as seen in FIG. 6.

FIGS. 8-11 show another preferred embodiment of the apparatus of the present invention, designated generally by the numeral 70. Stirring paddle apparatus 70 preferably includes paddle 71 having handle or grip 72, shaft 73, and blade section 74. Tapered section 75 is preferably positioned between handle or grip 72 and shaft 73. Tapered section 76 is preferably positioned in between blade section 74 and shaft 73. Blade section 74 preferably has opening 77. A sensor (e.g., thermometer) has a sensor tip 78 that preferably extends into opening 77. Sensor tip 78 preferably connects to sensor cable/shaft 81 which is preferably connected to a display or readout 84. Display or readout 84 can be a commercially available digital display preferably with LCD screen 85. Thermometers having display or readout, sensor cable or sensor shaft and sensor tip or probe are commercially available (e.g., www. Thermoworks.com; www-.reotemp.com). Paddle 71 preferably has elongated slot 79 (e.g., as cast or milled) that extends between display/readout 84 and sensor opening 77. Slot 79 preferably has a smaller diameter sensor cable section 80 that is sized and shaped to hold sensor cable/shaft 81 and a larger portion 83 that is sized and shaped to hold inlay 82. Inlay 82 can be oval shaped or elliptical in cross section. Inlay 82 can be secured to paddle 71 at inlay section 83 of elongated slot 79 with fasteners or adhesive or press/interference fit. Paddle 71 can include notch or recess or concavity 30 as seen in FIG. 1-7 on shaft 81.

Figure 12:
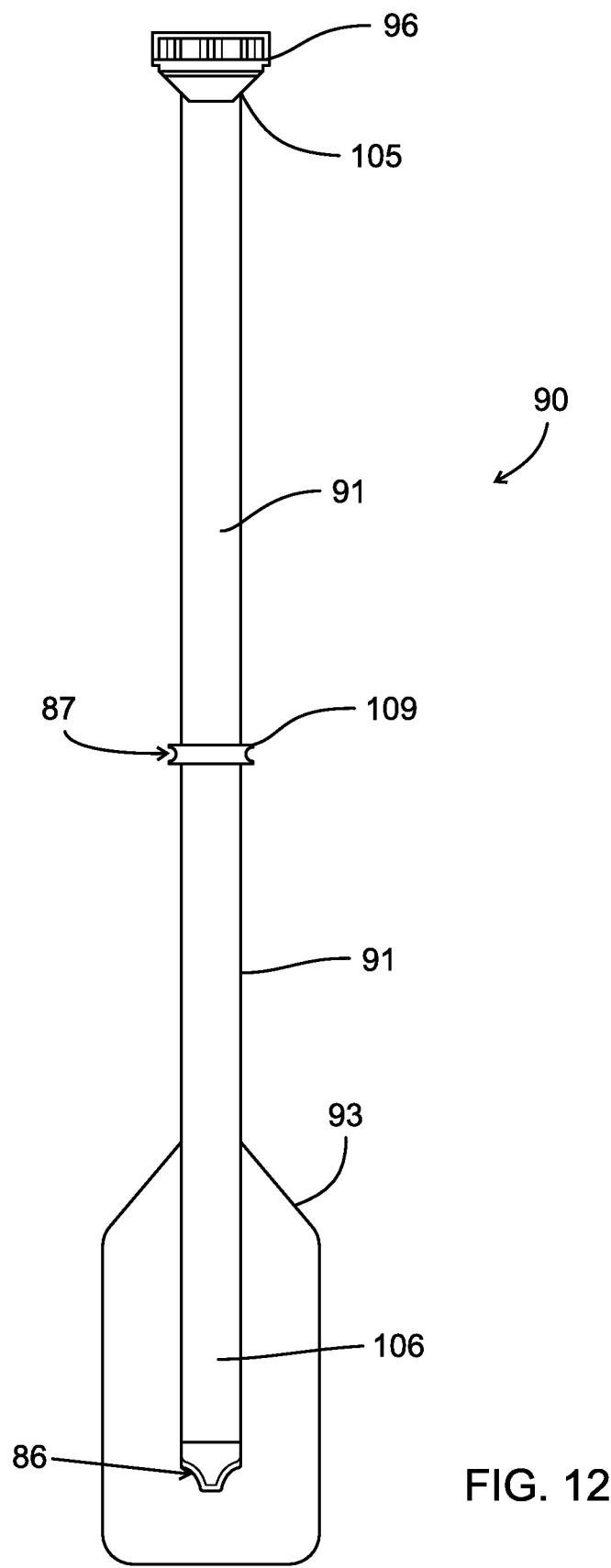
FIG. 12 illustrates a front elevation view of another preferred embodiment of the apparatus of the present invention.
Figure 13:
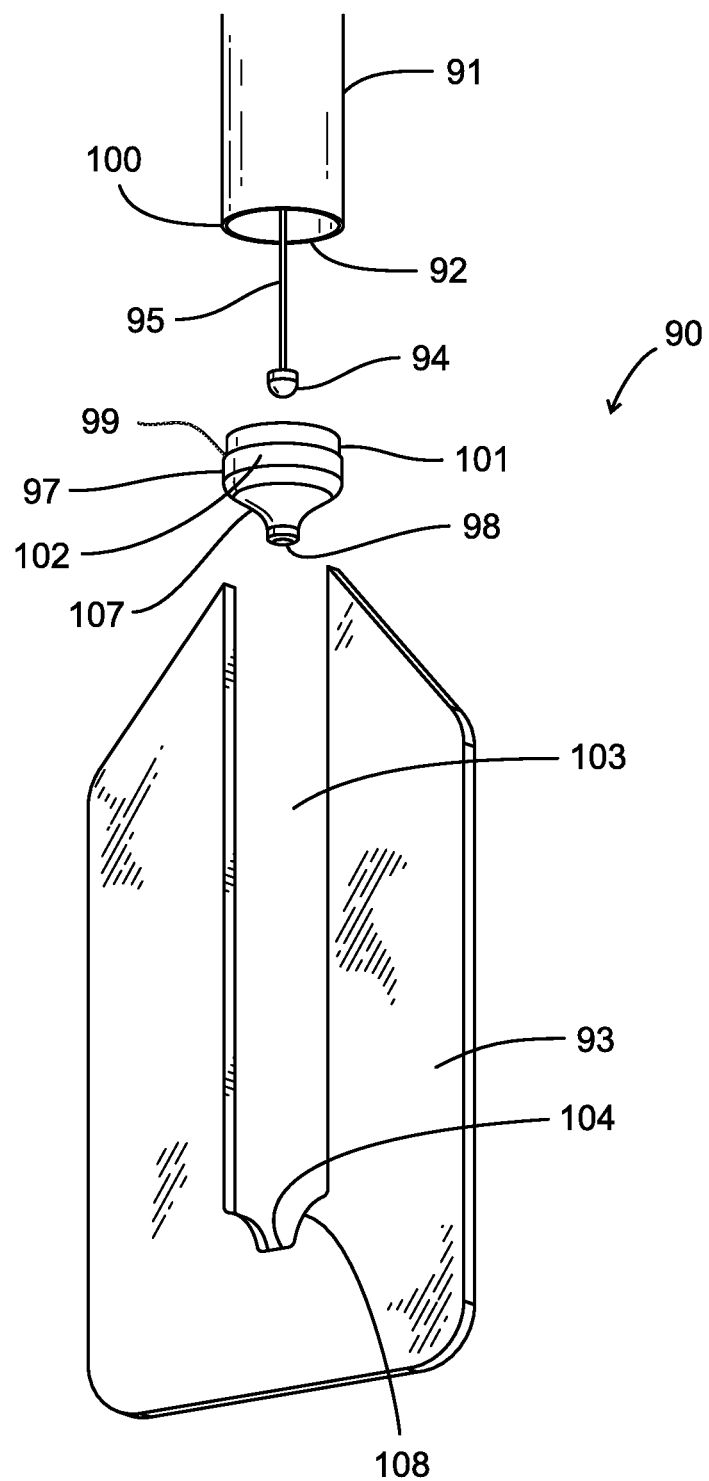
FIG. 13 is a partial exploded perspective view of a preferred embodiment of FIG. 12.

FIGS. 12-13 show another preferred embodiment of the apparatus of the present invention, designated generally by the numeral 90. Stirring paddle apparatus 90 preferably has an elongated tubular hollow shaft 91 having hollow bore 92. Blade section 93 is preferably connected to shaft 91 and fitting 97 with adhesive, welding or the like. Display or readout 96 is preferably fitted to an upper end 105 of shaft 91. Display or readout 96 is preferably similar to sensing device cable or thermometer 20 of the preferred embodiments seen in FIGS. 1-7. Blade section 93 is preferably fitted to lower end portion 106 of shaft 91. In FIG. 13, sensor cable/thermometer or sensor shaft 95 preferably occupies bore 92. Sensor cable/thermometer or shaft 95 preferably extends between sensor tip/probe 94 and display or readout 96. Fitting 97 can hold tip or probe 94. Probe 94 preferably extends into fitting opening/bore 98. Fitting 97 preferably has larger diameter section 102, smaller diameter section 101 and annular shoulder 99 in between the sections 101, 102. Annular shoulder 99 preferably registers against shaft 91 lower edge (annular edge) 100. Thus, recess 103 of paddle section 93 is preferably sized and shaped to hold lower end portion 106 of shaft 91 and fitting 97 as seen in FIG. 12. A portion of blade section 93 provides a stop 104 that fitting 97 abuts. Tapered section 107 of fitting 97 abuts tapered section 108 of blade section 93. An open ended space 86 is preferably provided in between fitting 97 and stop 104, so that fluid can contact sensor tip/probe 94.

One or more rings or collars 109 are preferably mounted on shaft 91 as seen in FIG. 12. Ring or collar is preferably placed near mid-point of paddle 90 for good balancing. Each ring or collar preferably has a concave outer recess or notch 87 that is receptive of bail or handle 37 of a pot basket, strainer or liner 35. As with the embodiment of FIG. 4, two persons can lift a liner, strainer or basket 35 filled with food items to be cooked by placing the bail or handle 37 of the basket, strainer or liner 35 in the concave portion of collar or ring 109. As with the embodiment of FIG. 4, one person would hold upper end portion 105 while the other person would hold lower end portion 106 during a lifting of basket 35 by two persons using apparatus 90. Also, as with the embodiment of FIG. 4, preferably when paddle 90 is held in a tilted position, bail or handle 37 remains vertically positioned, to prevent the food contents in basket, strainer or liner 35 from spilling out. Preferably, paddle 90 can be tilted at an angle wherein blade 93 or handle 91 touches pot 33, and bail or handle 37 preferably remains vertically positioned.

Figure 14:
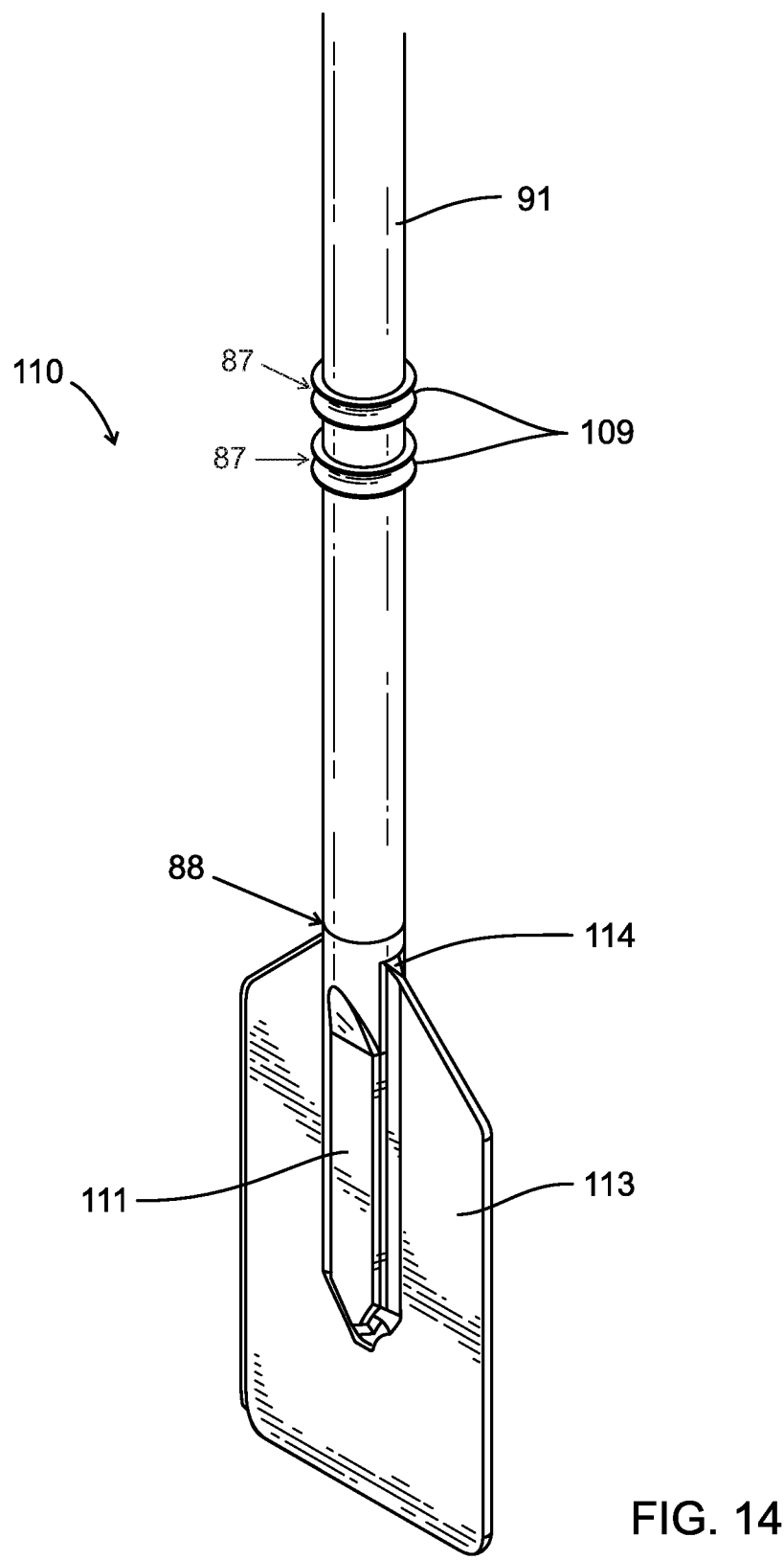
FIG. 14 illustrates a front elevation view of another preferred embodiment of the apparatus of the present invention.
Figure 15:
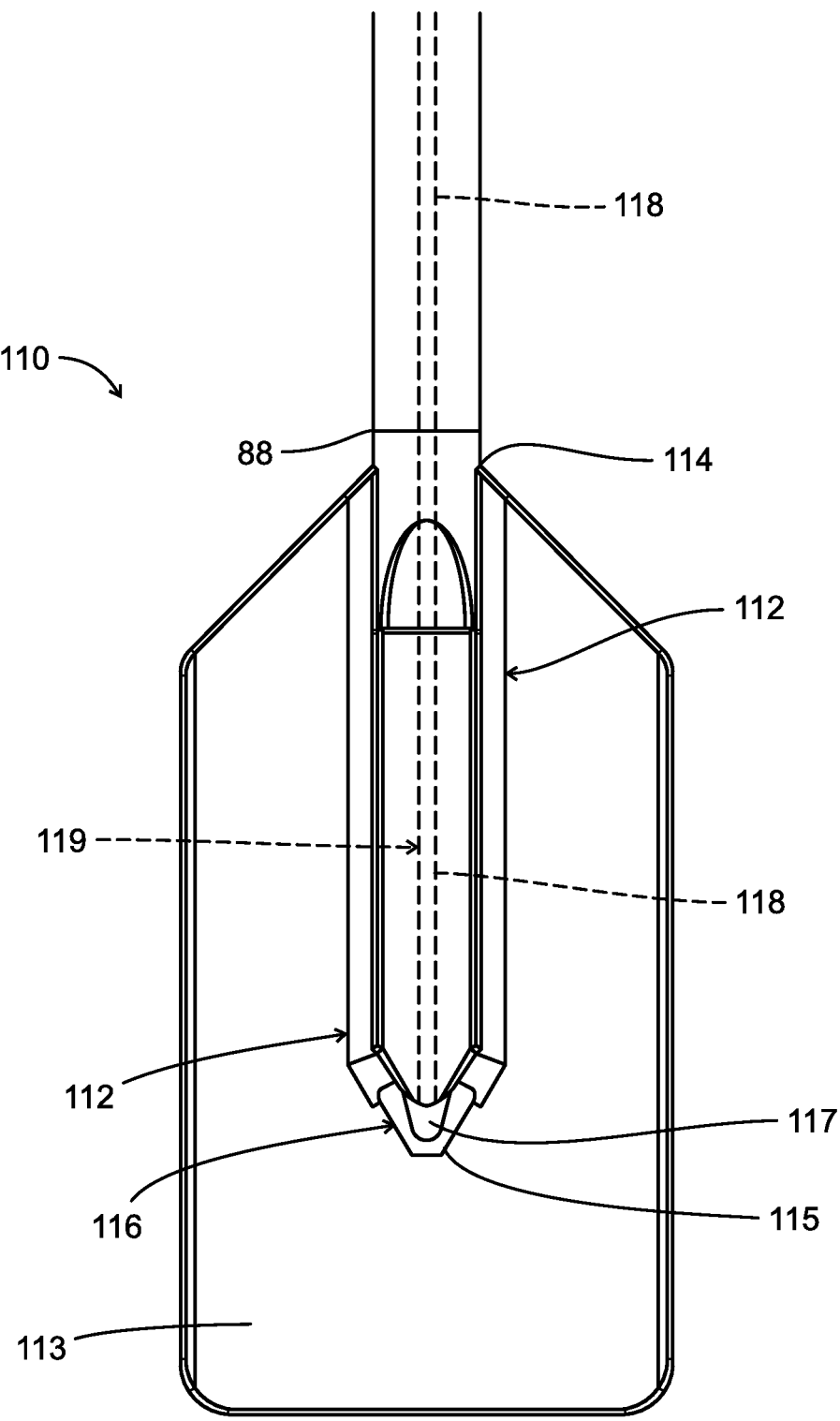
FIG. 15 is a partial fragmentary view of a preferred embodiment of FIG. 12.
Figure 16:
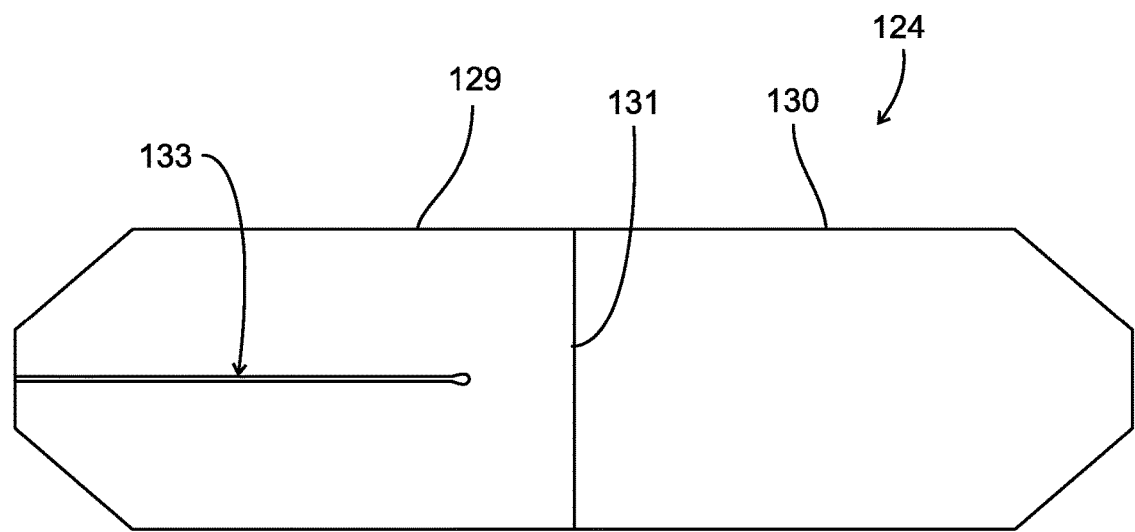
FIG. 16 illustrates a front elevation view of another preferred embodiment of the apparatus of the present invention.
Figure 17:
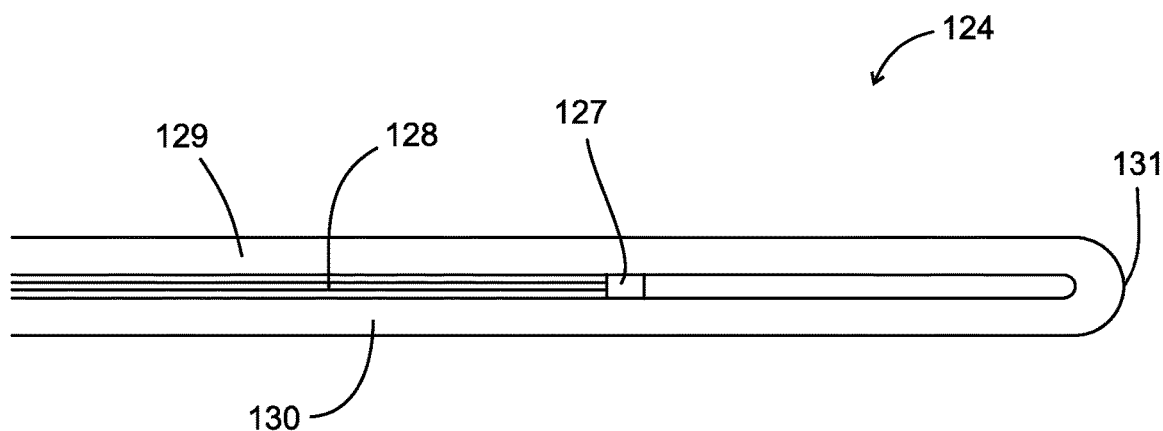
FIG. 17 is a partial side view of the embodiment of FIG. 16.
Figure 18:
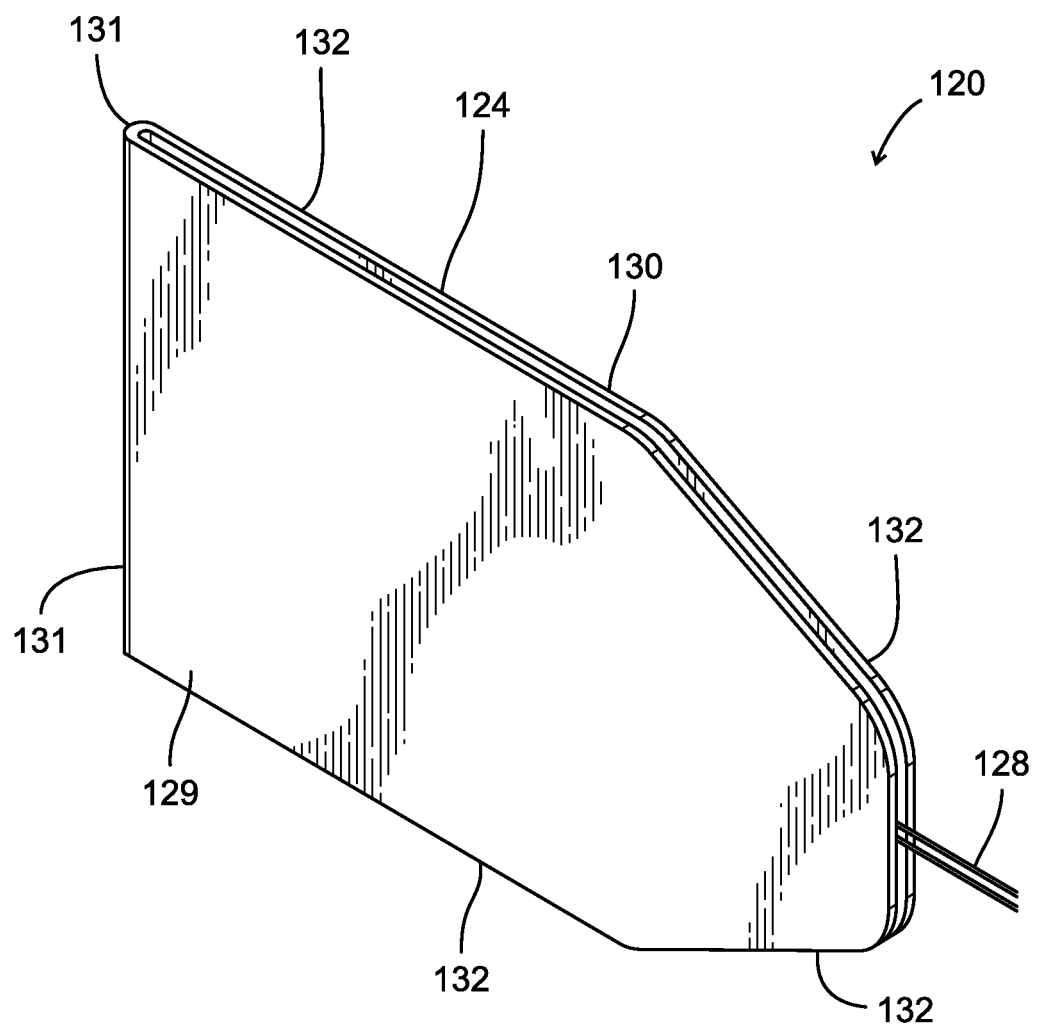
FIG. 18 is a partial perspective view of a preferred embodiment of FIG. 17.
Figure 19:
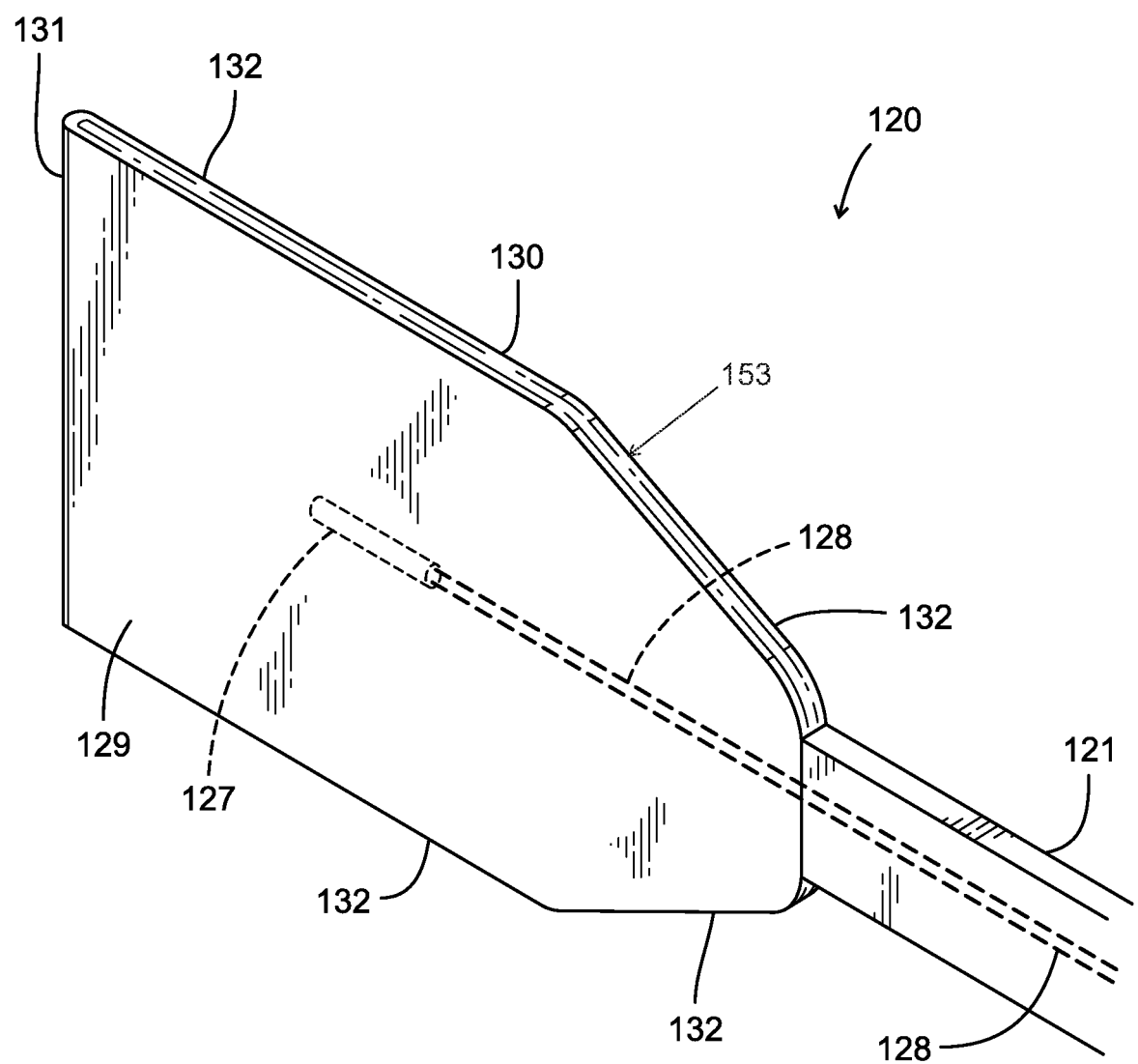
FIG. 19 is a partial perspective view of a preferred embodiment of FIG. 17.
Figure 20:
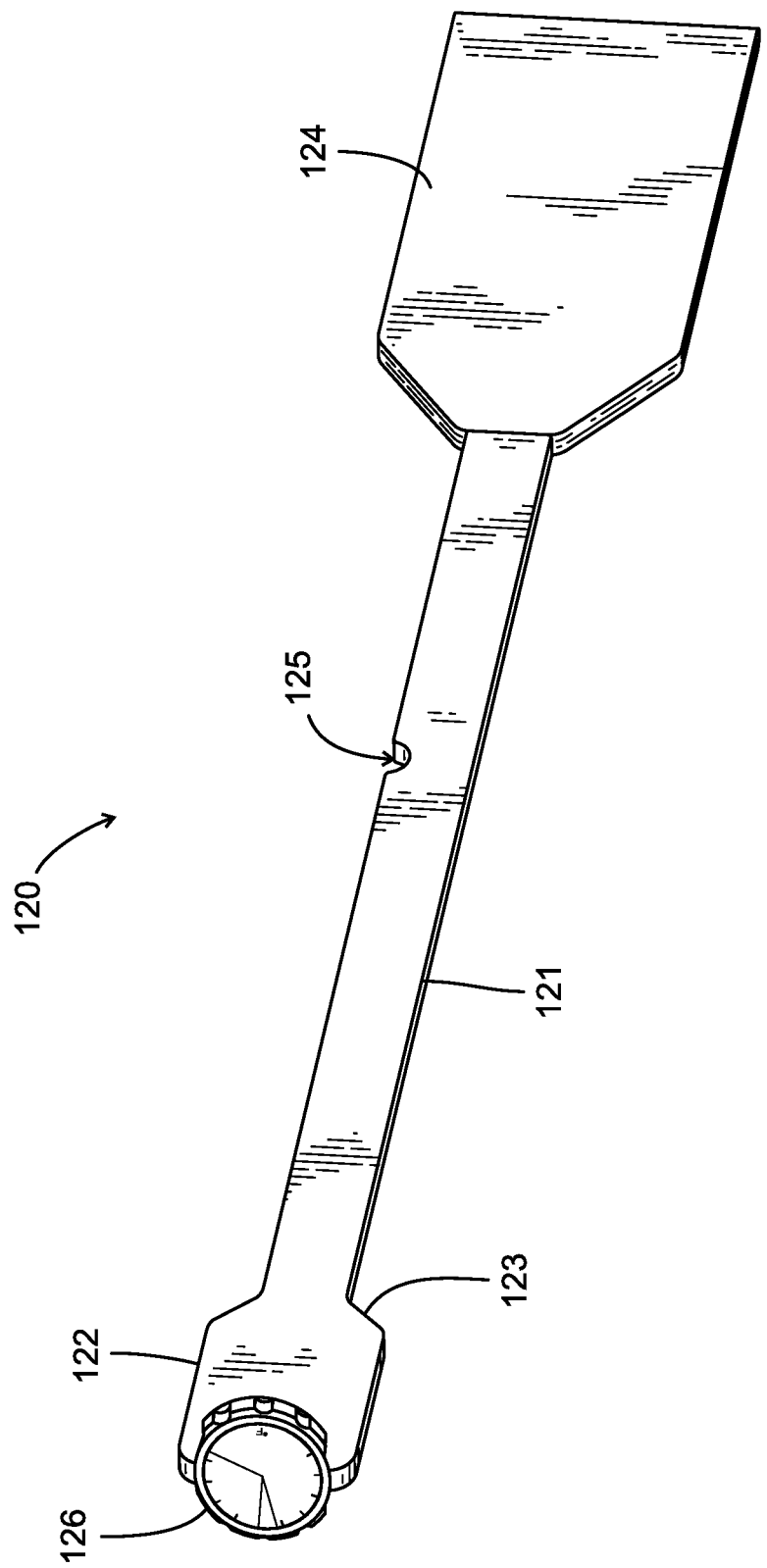
FIG. 20 is a perspective view of a preferred embodiment of FIG. 17.

FIGS. 14-15 show another preferred embodiment of the apparatus of the present invention, designated generally by the numeral 110. Paddle apparatus 110 is similar to the embodiment of FIGS. 12-13 but having a different fitting 111 that is preferably molded on blade section 113. Shaft 91 is preferably joined to blade fitting 111 at connection/joint 88, for example by welding. In FIGS. 14-15, fitting 111 is preferably hollow and preferably has a slot 112 that is receptive of sensor cable/thermometer or shaft 118 and sensor tip 117. The blade section 113 preferably does not have the recess or cut out 103 of the embodiment of FIGS. 12-13. Slot 112 of fitting 111 preferably extends between an upper portion 114 of the slot 112 and the bottom portion 115 of the slot 112. Fitting 111 preferably has an opening 116 that holds probe or sensor tip 117. Fitting 111 also has a bore or channel 119 that holds sensor cable/thermometer or shaft 118. Blade 113 is preferably made of metal or plastic.

FIGS. 16-20 show another preferred embodiment of the apparatus of the present invention, designated generally by the numeral 120. In FIGS. 16-20, paddle apparatus 120 preferably has an elongated shaft 121 with handle or grip 122 with display or readout 126 and tapered section 123. Display or readout 126 is preferably similar to sensing device cable or thermometer 20 of the preferred embodiments seen in FIGS. 1-7. Blade section 124 is preferably comprised of blade panels 129, 130 that are joined or connected at fold or bend 131. Shaft 121 preferably has notch, recess or concavity 125 for use lifting a basket 35 as with the embodiment of FIG. 4. Blade section 124 can be joined to shaft 121 by welding, fasteners, adhesive or other.

In FIGS. 16-20, probe or sensor 127 and sensor cable or thermometer 128 are preferably sandwiched between panels 129, 130 as seen in FIGS. 16-19. Sensor 127 is preferably positioned near fold or bend 131 of blade 124. Either or both of panels 129, 130 can provide a groove, recess or channel 133 sized and shaped to receive sensor 127 and sensor cable or thermometer 128. When folded as shown in FIGS. 17-20, blade section 124 has a periphery 132 that can be sealed at 153 by welding, adhesive or fasteners. Blade section 124 is preferably made of metal.

The following is a list of parts and materials suitable for use in the present invention:

PARTS LIST

PART NUMBER DESCRIPTION
10 stirring paddle with embedded sensor/apparatus
11 paddle
12 handle/grip/handle section
13 elongated shaft
14 blade section
15 tapered section/transition section
16 tapered section/transition section
17 opening
18 probe/sensor/sensing tip portion
19 sensing device
20 sensor device cable or thermometer
21 sensor device display
22 elongated slot
23 elongated slot
24 elongated slot
25 elongated slot
26 elongated slot
27 elongated slot
28 dial
29 pointer/needle/indicator
30 recess/notch/concave portion/concavity
31 upper end
32 lower end
33 pot
34 pot interior
35 basket/liner/strainer
36 basket opening
37 bail/handle
38 arrow
39 mid point
40 elongated bore
41 bore section
42 bore section
43 bore section
44 bore section
45 bore section
46 bore section
47 bore section
50 stirring paddle with embedded sensor/stirring apparatus
51 slot/opening
52 slot/opening
53 slot/opening
54 slot/opening
55 slot/opening
56 slot/opening
57 slot/opening
58 first surface of paddle
58 slot/opening
59 slot/opening
60 slot/opening
61 slot/opening
62 slot/opening
63 slot/opening
64 slot/opening
65 slot/opening
66 slot/opening 67 second surface of paddle
70 stirring paddle with embedded sensor/stirring paddle apparatus
71 paddle
72 handle/grip
73 shaft
74 blade section
75 tapered section
76 tapered section
77 sensor opening
78 sensor tip
79 elongated slot
80 sensor cable section
81 sensor cable/sensor shaft/wire
82 inlay
83 inlay section/larger portion
84 display/readout
85 LCD screen
86 space/opening
87 recess/notch
88 connection/joint
90 stirring paddle with sensor/stirring and sensing apparatus
91 elongated tubular shaft
92 hollow bore
93 blade section
94 sensor tip/probe
95 sensor cable/sensor shaft or thermometer
96 display/readout
97 fitting
98 probe opening/fitting bore
99 annular shoulder
100 shaft lower edge/annular edge
101 smaller diameter portion
102 larger diameter portion
103 recess/cutout
104 stop
105 upper end/upper end portion
106 lower end portion
107 tapered section
108 tapered section
109 ring/collar
110 stirring paddle with sensor/stirring paddle and sensing apparatus
111 fitting
112 slot
113 blade section
114 top portion/upper portion
115 bottom portion
116 opening
117 probe/sensor tip
118 sensor cable/shaft or thermometer
119 sensor/shaft bore
120 stirring paddle with sensor/stirring and sensing apparatus
121 shaft
122 handle/grip
123 tapered section
124 blade section
125 notch/recess/concavity
126 display/readout
127 probe/sensor
128 sensor cable/sensor shaft or thermometer
129 blade panel
130 blade panel
131 fold/bend
132 periphery
133 groove/recess/channel
140 member/section
141 member/section
142 member/section
143 member/section
144 member/section
145 member/section
146 member/section
147 member/section
148 member/section
149 member/section
150 member/section
151 member/section
152 member/section
153 seal The foregoing embodiments are presented by way of example only; the scope of the present invention is to be limited only by the following claims.

The invention claimed is:

1. A paddle thermometer apparatus comprising:
 a) an elongated shaft having a longitudinal axis and opposed first and second end portions;
 b) said shaft having a maximum transverse thickness;
 c) a handle attached to said first end portion;
 d) an enlarged paddle section attached to said second end portion, wherein said paddle section has a maximum thickness greater than said shaft transverse thickness;
 e) a plurality of spaced apart openings or slots wherein each said opening or slot is intersected by said longitudinal axis, at least one said opening or slot located in said enlarged paddle section;
 f) a thermometer having an elongated thermometer cable that extends between said handle and said paddle section;
 g) said thermometer cable including a sensor positioned in a said opening or slot that is located in said paddle section; and
 h) said thermometer including a display that enables display of a temperature value sensed by said sensor.

2. The paddle thermometer apparatus of claim 1 wherein the handle has opposed handle sides and wherein said display is mounted to one of said handle sides.

3. The paddle thermometer apparatus of claim 1 wherein the handle has a handle top and said display is mounted on said handle top.

4. The paddle thermometer apparatus of claim 1 further comprising a recess on said shaft that is sized and shaped to support a pot or basket rail.

5. The paddle thermometer apparatus of claim 1 wherein said openings include a first plurality of openings or slots on one side of said shaft and a second plurality of openings or slots on another side of said shaft, wherein each opening or slot of said first plurality are spaced away from each opening or slot of said second plurality.

6. The paddle thermometer apparatus of claim 4 wherein said recess is U-shaped.

7. The paddle thermometer apparatus of claim 4 wherein said recess is spaced in between two said openings or slots.

8. The paddle thermometer apparatus of claim 1 wherein said cable extends a majority of the distance between said handle and said paddle section.

9. A paddle thermometer apparatus comprising:
 a) an elongated shaft having a longitudinal axis and opposed first and second end portions;
 b) said shaft having a maximum transverse thickness;
 c) a handle attached to said first end portion;

d) an enlarged paddle section attached to said second end portion, wherein said paddle section has a maximum thickness greater than said shaft transverse thickness;

e) a plurality of spaced apart openings or slots wherein each said opening or slot is intersected by said longitudinal axis, at least one said openings or slots located in said enlarged paddle section;

f) a thermometer having an elongated thermometer cable that extends to said paddle section and along a majority of said shaft;

g) said thermometer cable including a sensor positioned in the said opening or slot that is located in said paddle section; and h) said thermometer including a display that enables display of a temperature value sensed by said sensor.

10. The paddle thermometer apparatus of claim 9 wherein each said slot or opening has a length and a width that is smaller than said length.

11. The paddle thermometer apparatus of claim 9 wherein said paddle section is comprised of a pair of metallic panels that sandwich a portion of said thermometer cable there between.

12. The paddle thermometer apparatus of claim 9 wherein said thermometer cable extends from said paddle section to said handle.

13. The paddle thermometer apparatus of claim 9 wherein said cable has upper and lower ends, said upper end connecting to said display and said lower end having said sensor.

14. The paddle thermometer apparatus of claim 9 wherein the slots are offset from said longitudinal axis.

15. The paddle thermometer apparatus of claim 9 wherein said openings or slots are spaced apart by at least 0.25 and 3.5 inches.

16. The paddle thermometer apparatus of claim 9 wherein some of said openings or slots are offset from others of said openings are slots and wherein multiple of said slots are offset from said longitudinal axis.

17. The paddle thermometer apparatus of claim 9 wherein the paddle section includes first and second blade panels connected together with said sensor between said blade panels.

18. The paddle thermometer apparatus of claim 9 further comprising one or more rings or collars on said shaft, each said ring or collar having a concave outer surface portion.

19. The paddle thermometer apparatus of claim 9 further comprising a fitting connected to said shaft, wherein said paddle section connects to said fitting.

* * * * *